United States Patent [19]

Takizawa et al.

[11] Patent Number: 5,572,635
[45] Date of Patent: Nov. 5, 1996

[54] METHOD FOR CHANGING A NATURAL IMAGE BASED ON A LIGHT ENVIRONMENT IN THE NATURAL IMAGE

[75] Inventors: Yuri Takizawa, Machida; Shinichiro Miyaoka, Kawasaki; Makoto Kato, Yokohama, all of Japan

[73] Assignee: Hitachi, Ltd., Tokyo, Japan

[21] Appl. No.: 892,962

[22] Filed: Jun. 3, 1992

[30] Foreign Application Priority Data

Jun. 4, 1991 [JP] Japan .................................. 3-132595

[51] Int. Cl.⁶ .................................................. G06T 15/50
[52] U.S. Cl. .......................... 395/126; 395/131; 382/167
[58] Field of Search .................................... 395/126, 131, 395/132, 135; 382/17, 167

[56] References Cited

U.S. PATENT DOCUMENTS

| | | | |
|---|---|---|---|
| 4,645,459 | 2/1987 | Graf et al. | 395/135 X |
| 5,276,779 | 1/1994 | Statt | 395/131 X |

FOREIGN PATENT DOCUMENTS 2-127781  5/1990  Japan .

OTHER PUBLICATIONS

Klinker et al., "The Measurement of Highlights in Color Images", International Journal of Computer Vision, 2, 7–32 (1988).

Takagi et al. "Accurate Rendering Technique Based of Colormetric Conception", Computer Graphics, vol. 24, No. 4, Aug. 1990, pp. 263–272.

Nishita et al., "Continuous Tone Representation of Three–Dimensional Objects Illuminated by Sky Light", Computer Graphics, vol. 20, No. 4, Aug. 1986, pp. 125–132.

Primary Examiner—Mark K. Zimmerman
Attorney, Agent, or Firm—Antonelli, Terry, Stout & Kraus

[57] ABSTRACT

A function of simulating change of weather and time in one scene by changing a sky area and an object area in a natural image while maintaining a relationship therebetween. The natural image is separated into a sky area and an object area excluding the sky area. The color of the object area is generated from a reflection model of the object, based on the color of sunlight, the color of a sky light, and a reflectance of the object. The sky light is determined by averaging pixel values of the sky area. The color of the sky light can be determined based on the color of the sunlight and meteorological conditions such as clouds and fog. The color of the sunlight, the meteorological conditions and the color of the sky light can be determined by specifying parameters representing time and weather. By changing the parameters, a simulation for changing the time and the weather can be performed on the entire natural image.

23 Claims, 10 Drawing Sheets

F I G. 12
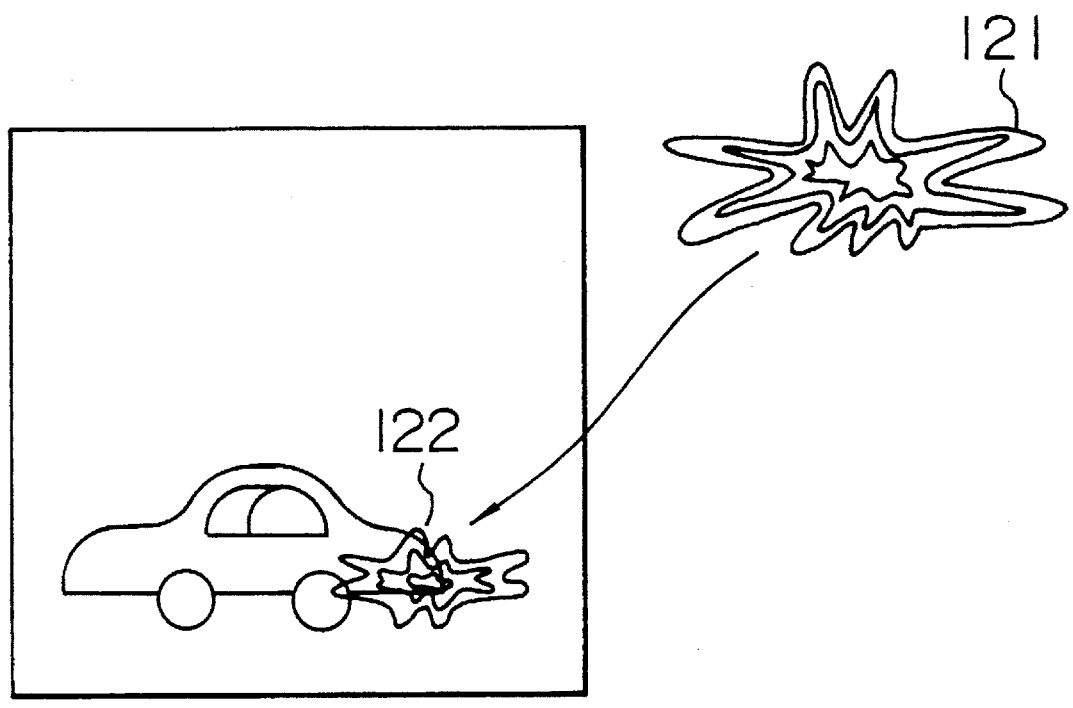
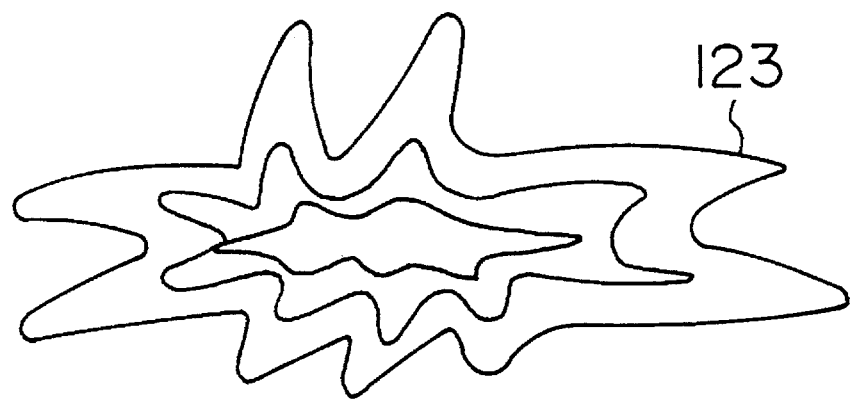

METHOD FOR CHANGING A NATURAL IMAGE BASED ON A LIGHT ENVIRONMENT IN THE NATURAL IMAGE

BACKGROUND OF THE INVENTION

The present invention relates to a method for processing a color image which is arranged to change colors of the color image, and more particularly to a method for changing a color image which provides a function of simulating change in a real-world environment due to factors such as weather and time in a natural image and is suitable for sales presentation of goods, layout simulation of buildings and color design of industrial products because of the simulating function.

In the field of computer graphics (referred to simply as CG), there have been proposed some techniques of creating an image by considering some factors such as time and weather for the purpose of realistically representing an object like a building in a natural environment and a scene where the object is located. Among those techniques, there exists a technique of generating an object area of an image by considering how sunlight and sky light changing due to factors such as time and weather influence an object in the image or generating an image of a sky area by considering factors such as time and weather.

There has been developed a technique of generating an image of a sky area by using a sky model which is a function of variables such as sun altitude and clear or cloudy weather. The technique is capable of representing an object by considering how the sunlight and sky light influence the object in the image. This technique was developed by Tomoyuki Nishita et al. and is discussed in SIGGRAPH '86 Conference Proceedings, Aug. 18–22, 1986, *Computer Graphics*, Vol. 20, No. 4, 1986, which will be referred to as reference 1.

There has been developed a technique of synthesizing a sky area of a natural image in a sky area of an image being generated, deriving proper sunlight and sky light in consideration of several meteorological conditions changing due to weather and time, and realistically representing an object by using the sunlight, the sky light and three-dimensional CAD data for the object. This technique was developed by Atushi Takagi et al. and is discussed in SIGGRAPH '90 Conference Proceedings, Aug. 6–10, 1990, *Computer Graphics*, Vol. 24, No. 4, Aug. 1990, which will be referred to as reference 2.

There has been developed a method of changing an object area in a natural image while keeping a texture and a shade and shadow of the object. This method is described in JP-A-2-127781, which will be referred to as reference 3. Specifically, this method is designed to consider a color of a light source in an image, that is, to simulate change of an object area in an image resulting from change of a color of the light source. In reference 3, when the three-primary color values in a color image are changed from (Rs, Gs, Bs) to desired values (Rs', Gs', Bs'), the three-primary color values of each pixel contained in an object area of the color image are changed from (R, G, B) to (R', G', B') according to the following set of expressions.

$$R'=Rs'/Rs \cdot R$$
$$G'=Gs'/Gs \cdot G \quad (1)$$
$$B'=Bs'/Bs \cdot B$$

Reference 3 is based on a reflection model of an object. This will be discussed with respect to FIG. 3. A ray of light 32 applied from a light source to an object 31 is divided into a light (specular reflective components) 34 reflected from an object surface 33 and another light (diffuse reflective components) 36 which enters into the object, repeatedly collides with colorants 35 contained in an object material, and emerges from the object. The specular reflective components are reflected at an angle defined by an incident angle and the surface direction of the object, and the diffuse reflective components are radiated in every direction. In a lustrous dielectric material, the specular reflective components have the same ratio of three-primary color values as the main light source and the diffuse reflective components have three-primary color values defined by the main light source and the solid reflectance of the object. Hence, the specular reflective components are referred to as a light source color and the diffuse reflective components are referred to as an object color. As shown in FIGS. 4(*a*) and 4(*b*), the light source color Cs=(Rs, Gs, Bs) 45 and the object color Cb=(Rb, Gb, Bb) 46 representing the diffuse reflective components appear in a distribution 44 within a three-primary color space of pixel values of an object area 43 of a color image 42 of an object 41. Thus, a pixel value C=(R, G, B) of the object area can be represented as follows.

$$C = MsCs + MbCb \quad (2)$$
$$= Ms \begin{bmatrix} Rs \\ Gs \\ Bs \end{bmatrix} + Mb \begin{bmatrix} Rb \\ Gb \\ Bb \end{bmatrix}$$

wherein Ms and Mb denote a scalar quantity. Ms is defined by a geometrical angle defined by a position of a main light source, the surface of the object and a position of a viewpoint (camera). Mb is defined by a geometrical angle defined by the position of the main light source and the object surface. When the three-primary color values of each pixel are projected onto a plane determined by the vectors Cs and Cb, it is assumed that those values are located at the spot defined by Ms and Mb.

As is obvious from the above expression, when the color of the light source is changed, the light source color Cs is changed. In actuality, however, when the light source color is changed from Cs=(Rs, Gs, Bs) to Cs'=(Rs', Gs', Bs'), the object color is changed as well. Assuming that the reflectance is Co=(Ro, Go, Bo), the changed object color Cb' can be obtained by the following expression.

$$Cb' = \begin{bmatrix} Rb' \\ Gb' \\ Bb' \end{bmatrix} = \begin{bmatrix} Ro \cdot Rs' \\ Go \cdot Gs' \\ Bo \cdot Bs' \end{bmatrix} = \begin{bmatrix} \frac{Rb}{Rs} \cdot Rs' \\ \frac{Gb}{Gs} \cdot Gs' \\ \frac{Bb}{Bs} \cdot Bs' \end{bmatrix} \quad (3)$$

The expression (1) can be executed for the entire object area.

The method disclosed in U.S. application Ser. No. 07/493,447, now U.S. Pat. No. 5,317,678 (referred to as reference 4), is desired to consider how a surface light source like a sky light as well as a single light source influence an object.

Reference 4 is useful in representing an image formed by imaging an object in a natural environment, that is, an object in an environment wherein a surface light source like the sky light exists in addition to a single or main light source like the sun. Reference 4 makes it possible to simulate how the object appears when the light environment changes due to changes in environmental factors such as time and weather in the natural environment. That is, it is possible to determine the relation between the sunlight and the sky light and the environmental factors such as time and weather, wherein the sunlight is a main light source and the sky light is a surface light source.

The sky light will be discussed with respect to FIG. 5. In general, light 51 from the main light source influences a clear sky 52 around an object 53, so that the clear sky 52 serves as a surface light source for the object 53. This surface light source produces a sky light 54 which colors a shadow 55 on the object 53 which receives no light from the main light source. According to reference 4, the color of the object can be represented by the following expressions.

$$C = MsCs + MbCb + MdCd + Ca + B \quad (4)$$

$$Ca = \begin{bmatrix} Ra \\ Ga \\ Ba \end{bmatrix} = \begin{bmatrix} Ro \cdot Rap \\ Go \cdot Gap \\ Bo \cdot Bap \end{bmatrix} \quad (5)$$

$$Cap = \begin{bmatrix} Rap \\ Gap \\ Bap \end{bmatrix} \quad (6)$$

wherein Cap (expression (6)) is the color of the sky light 54 from the surface light source and Ca (expression (5)) is the color of light 56 reflected from the surface of the object 53 at a solid reflectance Co=(Ro, Bo, Go). The vector Cd represents a shift from a plane defined by a light source color and an object color for each pixel value. The shift represents the texture of the object. The vector B represents an influence of an image input device such as a camera or a scanner on the image. FIG. 6 shows how each pixel value of an object is distributed in a three-primary color space, based on the model of reference 4.

CG-based methods including those described in references 1 and 2, have made it possible, although difficult, to obtain a realistic image by generating lots of data such as three-dimensional data of an object and doing lots of calculations.

Reference 1 provides a function of simulating the change of a sky area resulting from the change of weather, time and the like. However, the simulating function does not consider scattered clouds in the sky area when simulating the change of the sky area. Hence, it needs additional operations, such as creating clouds by using a CG method, for the purpose of obtaining a sky area which is as realistic as the sky area of a natural image.

Reference 2 is capable of representing an object very realistically. For that purpose, however, it requires very detailed modeling of a three-dimensional object and a light source, and several measured data such as meteorological data and a reflectance of an object, in addition to lots of calculations. Further, the main purpose of reference 2 is to simulate the change of how an object appears based on factors such as weather and time. As such, no image of a sky area is generated.

References 3 and 4, like the present invention, use information about a natural image and do not need to generate a lot of data, thus making it easy to generate a realistic image, unlike the CG-based methods. However, references 3 and 4 have the following disadvantages.

That is, reference 3 considers an object illuminated by a single light source. Hence, it does not have a sufficient capability of representing an object illuminated by a sky light. Further, it does not consider the change of the sky area in a natural image when representing the object.

Reference 4 does consider a surface light source like a sky light as a light source. Hence, it can represent an object illuminated by the sky light. However, like reference 3, it does not consider the change of the sky area in a natural image.

SUMMARY OF THE INVENTION

It is an object of the present invention to provide a method which is capable of easily and realistically simulating change of an environment resulting from change of weather and time using a natural image.

It is a further object of the present invention to provide a method which is capable of realistically simulating change of an object area and a sky area resulting from change of factors such as weather and time while maintaining a relationship between the object area and the sky area.

It is another object of the present invention to provide a method which is capable of flexibly simulating change of an environment in one scene by freely changing and specifying parameters representing environmental factors such as weather and time.

Common parameters relating to a light source, time and weather are used in a process of changing a sky area of a natural image and a process of changing areas other than the sky area, such as a distant view, an object, a shadow of the object, and the ground.

To change the sky area, it is necessary to change at least one of a parameter representing a color of a main light source for an image, a parameter representing the position of the main light source, and a parameter representing time factors such as time and season, or to use a sky area obtained from a model image as the changed sky area.

To change areas other than the sky area, it is necessary to change at least one of the parameter representing the color of the main light source for the image and a parameter representing a color of a surface light source for the image.

The color of the surface light source can be obtained from the color of the sky area.

To change the parameter representing the color of the main light source for the image and the parameter representing the position of the main light source, it is necessary to change at least one of the parameter representing time factors such as time and season and a parameter representing weather factors such as an amount of clouds.

To change the parameter representing the color of the main light source for the image, the parameter representing the position of the main light source and the parameter representing the color of the surface light source, it is necessary to change at least one of the parameter representing time factors such as time and season and the parameter representing weather factors such as an amount of clouds.

To change at least one of the parameter representing the color of the main light source for the image, the parameter representing the position of the main light source, the parameter representing time factors such as time and season, and the parameter representing weather factors such as an amount of clouds, it is necessary to use a corresponding parameter inferred from a model image.

To change at least one of the parameter representing the color of the main light source for the image, the parameter representing the position of the main light source, and the parameter representing the color of the surface light source, it is necessary to use a corresponding value inferred from the model image, that is, an inferred color of the main light source, an inferred location of the main light source and an inferred color of the surface light source.

The sky area of the image may be separated into a texture image representing information like clouds and haze and a fundamental sky image. At least one of the texture image and the fundamental sky image is changed and then the changed sky area is generated by combining the pixel values of the two images.

The sky area of the image may be separated into a texture image representing information like clouds and haze and a non-texture image. At least one of the texture image and the non-texture image is changed and then the pixel values of the two images are combined.

The sky area of the image may be separated into a cloud area and a non-cloud area. At least one of the cloud area and the non-cloud area is changed and then both of the areas are combined.

To change a color of an object in a natural image, it is necessary to change at least one of a reflectance of the object, a color of a main light source for the object and a color of a surface light source for the object.

To change the color of the object, it is necessary to perform the steps of extracting a vector of a light source color representing specular reflection, a vector of an object color representing diffuse reflection, and a vector of an ambient color representing a shift from an origin of a distribution of pixel values of an object area, those vectors representing a color of each pixel of an object area in a color space by means of a linear combination, changing at least one of the reflectance of the object, the color of the main light source, and the color of the surface light source so as to change the vector, and changing the color of each pixel contained in the object area based on the changed vectors.

Each pixel value of an object area before change is represented by $C=C_s M_s + C_b M_b + C_a$ To change the color of the object, it is necessary to carry out at least one of the process of changing a light source vector Cs and an object color vector Cb by changing the color of the main light source and the process of changing an ambient light vector Ca by changing the color of the surface light source.

Assuming that the color of an area to be changed is C=(R, G, B), the changed color of the area is C'=(R', G', B') and the vector representing the distance from the origin of the distribution of the pixel values of the area in the color space is Ca=(Ra, Ga, Ba), the following expression can be derived by letting Ks=(rks, gks, bks) and Ka=(rka, gka, bka).

$R'=rks*(R-Ra)+rka*Ra$ $G'=gks*(G-Ga)+gka*Ga$ $B'=bks*(B-Ba)+bka*Ba$

With these expressions, the changed pixel values can be calculated.

Assuming that the color of the main light source before the change is S=(Rs, Gs, Bs) and the color vector after the change is S'=(Rs', Gs', Bs'), Ks=(rks, gks, bks) may be derived from the following expressions.

$rks=Rs'/Rs$ $gks=Gs'/Gs$ $bks=Bs'/Bs$

Assuming that the color of the sky light before the change is Cap=(Rap, Gap, Bap) and the color of the sky light after the change is Cap'=(Rap', Gap', Bap'), Ka=(rka, gka, bka) can be derived from the following expressions.

$rka=Rap'/Rap$ $gka=Gap'/Gap$ $bka=Bap'/Bap$

Assuming that the color of the sky light before the change is Cap=(Rap, Gap, Bap), the color of the sky light after the change is Cap'=(Rap', Gap', Bap') and a variable reflecting the position of each pixel on the object is g, Ka=(rka, gka, bka) can be derived from the following expressions.

$rka=Rap'/Rap*$ $gka=Gap'/Gap*$ $bka=Bap'/Bap*$

The object is divided into a plurality of areas on the basis of an angle defined by angle between the object itself and the sky orientation and an angle defined by the ground and the object itself. The variable g taking into account the position of each pixel on the object has respective values corresponding to the areas.

The ambient light vector Ca has respective values corresponding to the areas.

The main light source is the sun.

The image of a sky area can be obtained by matching the sky image to a sky model obtained by modeling the hemisphere of the sky from the viewpoint from which the image is picked up. The process of matching the sky image to the sky model is carried out by using a model image in which an angle of orientation of each point and an angle representing a height of each point are related to the sky image.

The process of changing a shadow in a natural image is carried out by changing at least one of the parameters representing the position of the main light source, the color of the main light source, the color of the surface light source, weather factors such as an amount of clouds, and time factors such as time and season. The process of changing the shadow is carried out by changing the parameter representing weather factors such as an amount of clouds for averaging on the border of the shadow.

To change the color of the shadow, it is necessary to change at least one of the parameters representing the color of the surface light source and weather factors such as an amount of clouds.

The process of changing a cloud image is carried out by determining at least one of the form of a cloud and the position of the cloud in the sky model and changing the cloud image based on the determined information.

The process of changing a cloud image is carried out by determining at least one of the color of the main light source, the color of the surface light source, and the position of the main light source and changing the cloud image based on the determined information.

The process of changing the color of the main light source is carried out by changing the color of the main light source based on the position of the main light source and the position of the cloud.

A cloud is synthesized in the image according to the specified weather. To change the color of an object having an illuminating function, it is necessary to change at least one of time and the position of the sun.

To change the color of the object having an illuminating function to an illuminating color, it is necessary to average the pixel values of the image around the object with the illuminating color.

According to the weather specification, the dynamic range of the pixel values of the image is changed.

According to the weather specification, the distribution of the pixel values of the image is changed as well.

The process of changing the sky area of an object image is carried out by synthesizing a sky area from a model image. The process of changing the non-sky area of the object image is carried out by using at least one of the color of the main light source, the position of the main light source and the color of the surface light source inferred from the model image.

BRIEF DESCRIPTION OF THE DRAWINGS

FIG. 12 is a view for explaining a process of changing the color of a lamp to an illuminating color;

DESCRIPTION OF THE PREFERRED EMBODIMENTS

In an actual environment, a sky color is relevant to how an object on the ground appears. Hence, the sky area in a natural image can be considered to be related to an area excluding the sky, i.e. a non-sky area, such as a distant view, an object, the ground and an object shadow.

In the actual environment, the factors for determining a color of the sky include a color of sunlight and a position of the sun in addition to meteorological conditions such as clouds, fog and haze. The color of the object is determined by the reflectance of the object and characteristics of light from a light source illuminating the object, that is, the wavelength, the intensity and the direction of the light from the light source. The light source for an object in a natural environment is mainly sunlight and sky light from the sky. The sky light is considered to depend on the color of the sky. As stated in reference 1, the color of the sky depends on the color of the sunlight and the altitude of the sun.

Figure 7:
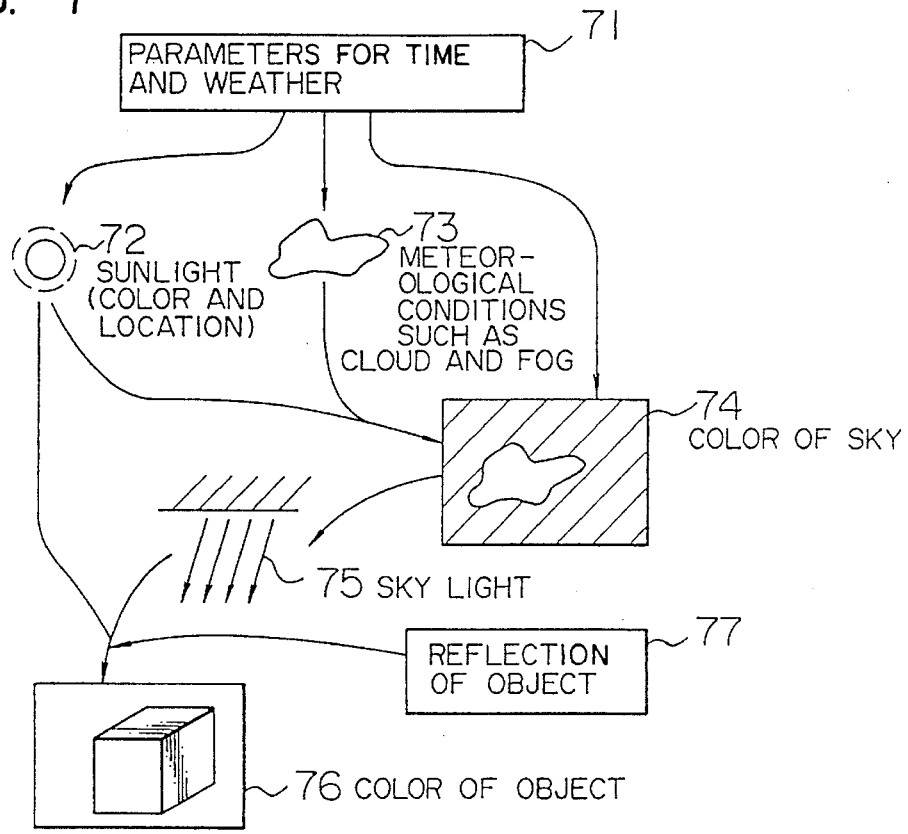
FIG. 7 is a view for explaining how colors of various areas of an object are changed according to the present invention.

Then, as shown in FIG. 7, if an object to be changed by a change of sunlight 72 is determined with respect to a sky area 74 and an object area 76 in a natural image, it is possible to change the sky area 74 and the object area 76 while maintaining a relationship between both areas when the sunlight 72 changes. Further, if an object to be changed by a change of a sky light 75 is extracted from the object area 76, it is possible to change the appearance of the object, that is, how the object appears, together with changing the sky light 75 when the sky area in the natural image is changed by meteorological factors 73 such as clouds and fog.

If the sunlight 72, the color of the sky area 74 and the sky light 75 are related to parameters 71 representing time and weather such as an amount of clouds, by changing the parameters representing time and weather, it is possible to simulate change of time and weather in a real world in a sky area and an object area of a natural image.

First of all, a change of the sky area will be discussed.

Figure 8:
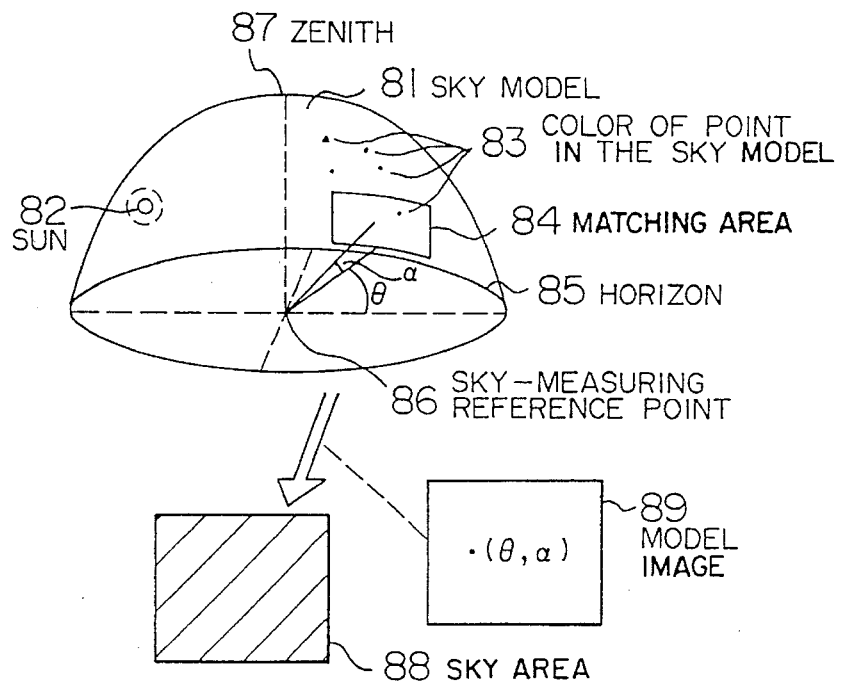
FIG. 8 is a view for explaining a sky model.
Figure 9:
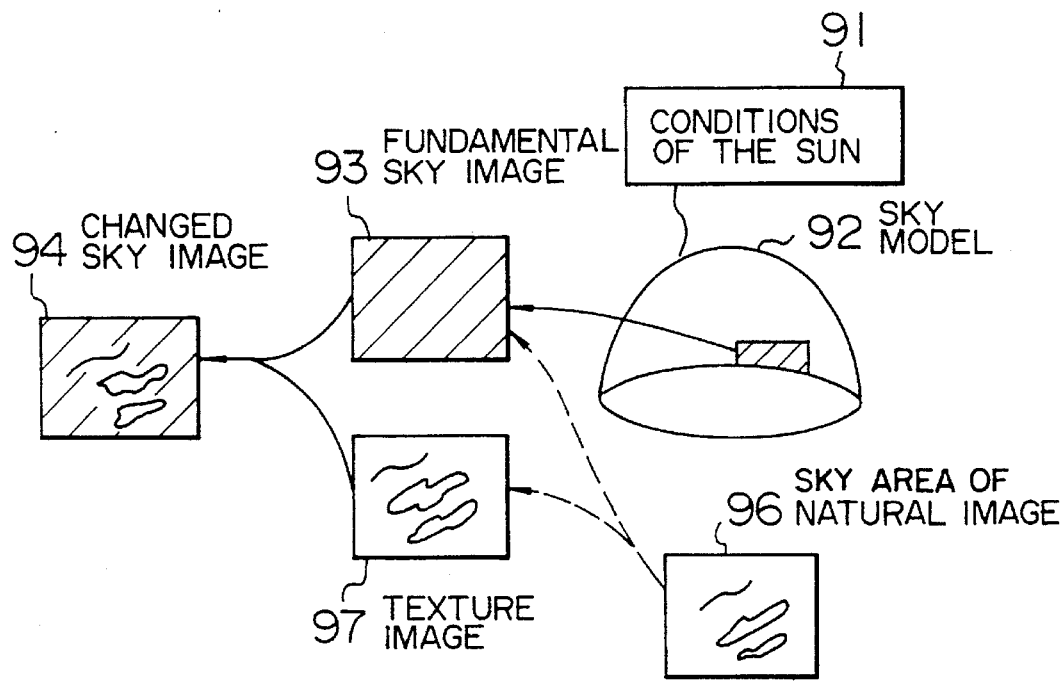
FIG. 9 is a view for explaining a process of changing a sky area.

As described in reference 1, the brightness of either a clear sky (no clouds) or a cloudy sky (sky covered with clouds) can be represented by a function of factors such as a color of sunlight and a position of the sun. As shown in FIG. 8, by using such a function, it is possible to define a sky model 81 in which the color 83 of each point ranging from a zenith 87 to a horizon 85 is modeled. By matching a sky area 88 in the natural image to an area of the sky model 81 as shown by reference number 84, it is possible to change the color of the sky area 88 by changing the color of the sunlight and the position of the sun 82. To obtain a changed sky area 88 immediately when the color 83 of each point in the sky model 81 is changed by changing the conditions of the sun, it is necessary to generate a model image 89. The model image 89 represents the position of points in the sky model 81 which correspond to the pixels of the sky image 88. The parameters of the model image 89 are an angle θ of orientation of each point around a sky-measuring reference point 86 and an angle α representing a height of each point above the horizon 85. In the sky area 88 obtained by the above method, the color of each point in the sky area 88 depends only on the position of the point in the sky area 88. Hence, a realistic sky image cannot be generated. As shown in FIG. 9, therefore, by adding information specific to the natural image, such as clouds, fog and haze, it is possible to generate a realistic sky image. Hereafter, the image uniquely generated from the sky model 92 under conditions 91 such as the color of the sunlight and the position of the sun is referred to as a fundamental sky image 93. The image specific to the natural image, that is, an image representing information such as clouds, fog and haze, is referred to as a texture image 97. By generating the fundamental sky image 93 and the texture image 97 from the sky area 96 of the natural image in advance, it is possible to change the color of the sunlight in the natural image, that is, the time of day, without changing the information specific to the natural image by generating the fundamental sky image 93 based on the desired color of sunlight and combining the texture image 97 and the fundamental sky image 93 to obtain a changed sky image 94.

To change the weather from cloudy to clear or vice versa when the sky model, that is, the fundamental sky image, is generated, a function of a blue base (clear) and a function of a white base (cloudy) are prepared and the appropriate one of these functions is selected according to the weather. Two methods can be used for generating the fundamental sky image. One method involves using the function, and the other method involves specifying a weather model image and using the model fundamental sky image. The fundamental sky image can be continuously generated based on the time and the weather, or several kinds of images can be generated and a desired image can be generated by interpolating those images.

Figure 10:
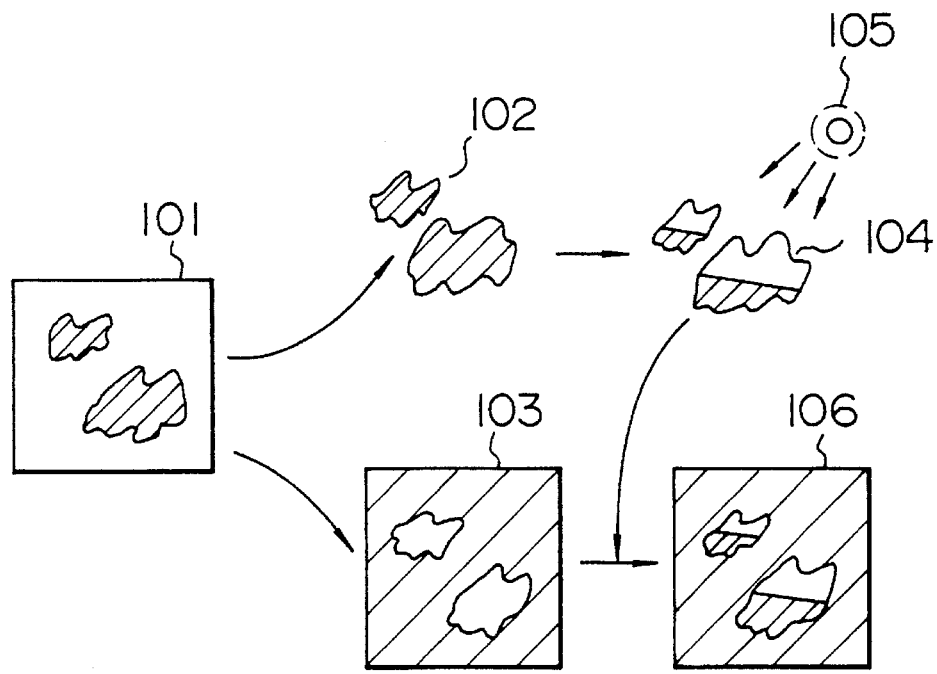
FIG. 10 is a view for explaining a process of changing a cloud area.

In the foregoing generation of the fundamental sky image, when the time of the day, i.e. the location and the color of the sun, is changed, the cloud area may not be properly changed. This is because the three-dimensional nature of the cloud is not taken into consideration. To avoid such a disadvantageous situation, as shown in FIG. 10, if the cloud area can be recognized clearly to some extent, a sky area 101 can be separated into a cloud image 102 and a non-cloud image 103. The separated cloud image 102 is changed based on the location and the color of the sun 105 as indicated by a reference number 104. Then, the changed cloud image 104 is synthesized with the non-cloud image 103 to obtain a sky image 106. The form of the cloud and the position of the cloud in the three-dimensional sky model are determined in advance. Based on the form and the position of the cloud and the location and the color of the sun, the color of the cloud is changed.

For the purpose of changing the weather, by synthesizing a cloud image on an area where no cloud exists, clear weather may be changed into cloudy weather. Alternatively, by synthesizing a sky image having no clouds on an area where clouds exist, cloudy weather may be changed into clear weather.

Second, the change of an object area will be discussed below.

To represent an object by a reflection model, it is necessary to specify a light source for applying a ray of light to the object. As mentioned above, according to the invention, the light sources are the sunlight (main light source) and the sky light (surface light source). The present invention employs the reflection model described in reference 4.

Figure 5:
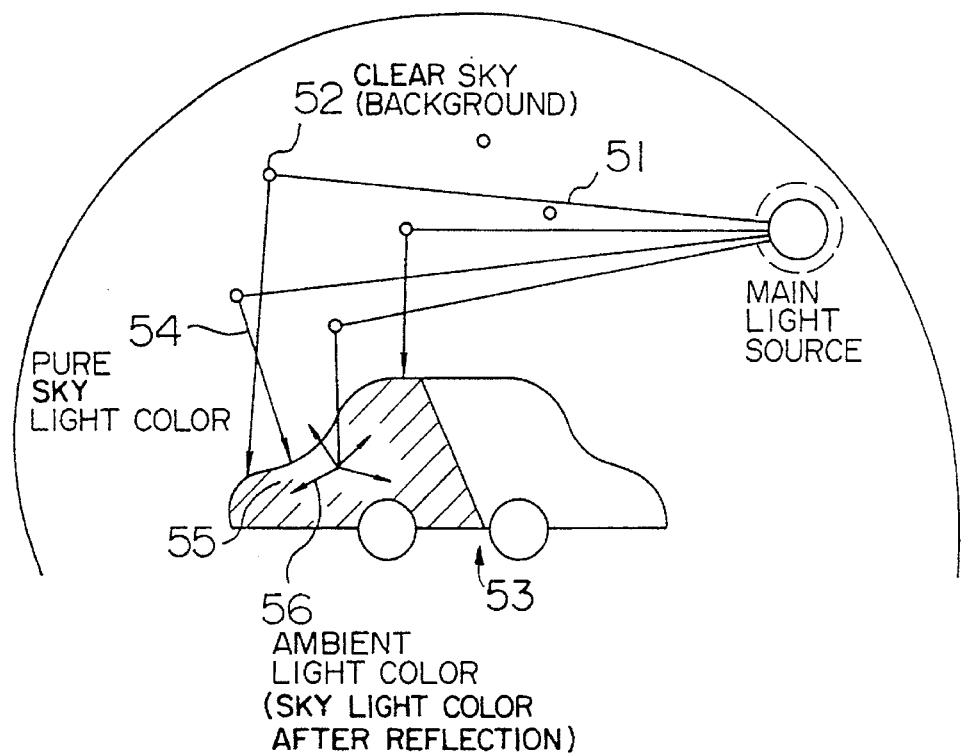
FIG. 5 is an explanatory view showing a prior art model for explaining a sky light.
Figure 6:
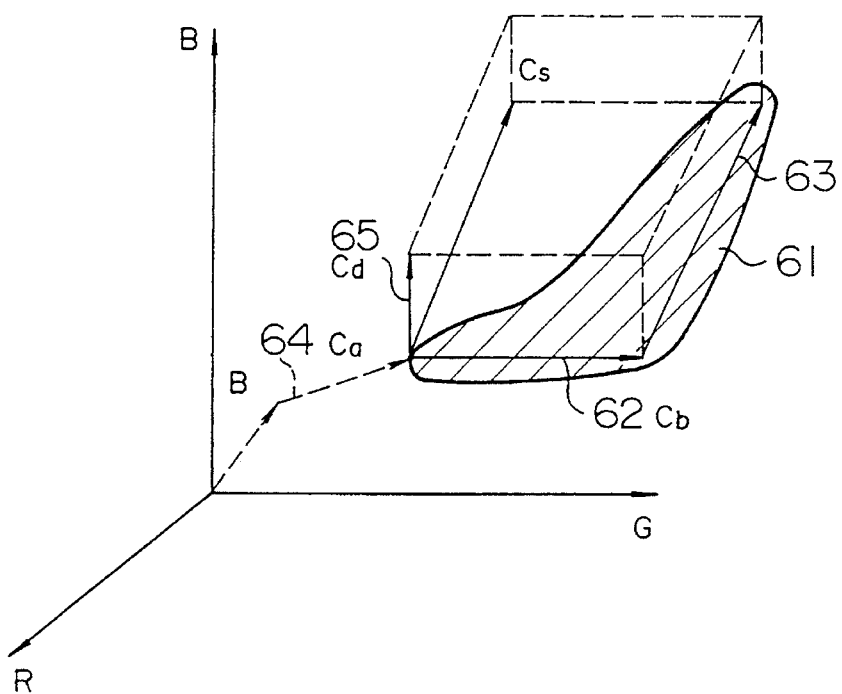
FIG. 6 is an explanatory view showing a distribution of pixel values of an object in a three-primary color space according to a prior art model.

According to reference 4, the color of each pixel contained in the object area is represented by the expressions (4), (5) and (6) set forth above. Referring to FIG. 6, the color of the object illuminated by the sunlight appears in the distribution 61 near a plane defined by a specular reflective component Cs 63 of the sunlight and a diffuse reflective component Cb 62 in the color space. The sky light corresponds to Cap indicated in the expressions (5) and (6) set forth above and the color of the object illuminated by the sky light is represented by the vector Ca 64 representing a shift of the distribution from the origin of the color space. Assuming the sky light 54 is applied to the object 53 from every direction as shown in FIG. 5, the influence of the sky light 54 is similarly applied to each point.

With the method of reference 4, it is possible to change the color of the object area in accordance with a change in the color of the sunlight and the sky light by changing the vectors Cs, Cb and Ca.

In the case where it is impossible to assume that the sky light is applied to the object from every direction, the object is divided into several areas in advance, and the color of each area is changed separately. For each area, a corresponding Ca is used.

The foregoing color change resulting from the change of the vectors is equivalent to applying $Ks=(rks, gks, bks)$ and $Ka=(rka, gka, bka)$ to the color C of the area to be changed $C=(R, G, B)$, the changed color C' of the area $C'=(R', G', B')$ and $Ca=(Ra, Ga, Ba)$ and performing the following arithmetic operations.

$$R'=rks*(R-Ra)+rka*Ra$$
$$G'=gks*(G-Ga)+gka*Ga \quad (7)$$
$$B'=bks*(B-Ba)+bka*Ba$$

Herein, assuming that the color of the light source is $Cs=(Rs, Gs, Bs)$ and the changed color of the light source is $Cs'=(Rs', Gs', Bs')$, Ks can be determined as follows.

$$rks=Rs'/Rs$$
$$gks=Gs'/Gs \quad (8)$$
$$bks=Bs'/Bs$$

Assuming that the color of the sky light is $Cap=(Rap, Gap, Bap)$ and the changed color of the sky light is $Cap'=(Rap', Gap', Bap')$, Ka can be determined as follows.

$$rka=Rap'/Rap$$
$$gka=Gap'/Gap \quad (9)$$
$$bka=Bap'/Bap$$

If it is assumed that the influence of the sky light varies according to the position of each pixel on the object, the variable resulting from the location of each pixel on the object may be represented by g. Hence, the following expression can be derived.

$$rka=Rap'/Rap*g$$
$$gka=Gap'/Gap*g \quad (10)$$
$$bka=Bap'/Bap*g$$

Figure 11:
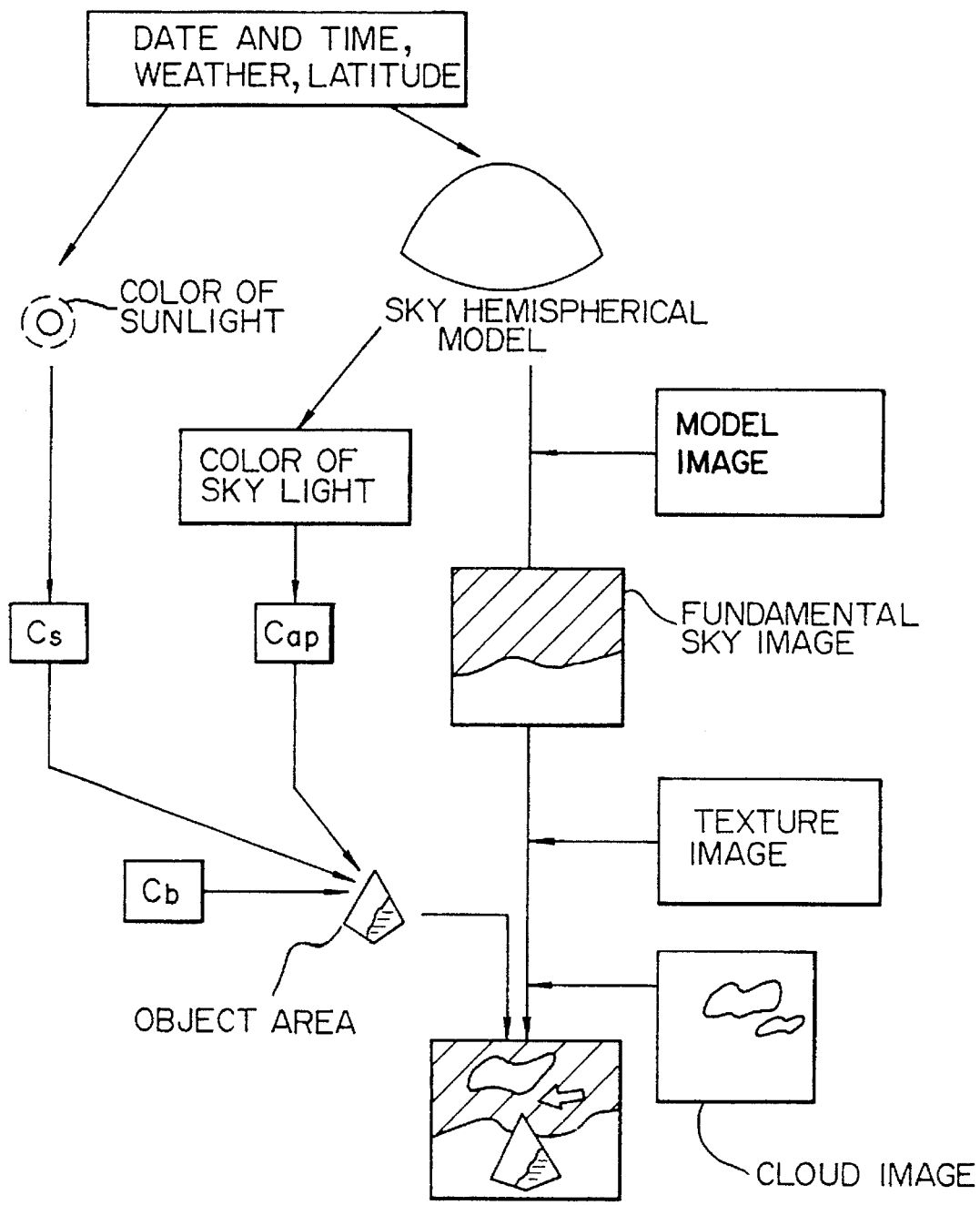
FIG. 11 is a view for explaining a process of changing the color of a sky area and the color of a non-sky area during a simulation for changing time and weather.

A summary of the foregoing methods for changing the colors of a sky area and a non-sky area is illustrated in FIG. 11.

Third, a method for changing a shadow area will be discussed.

A shadow area is a portion where no light is applied from a main light source. Hence, the color of the shadow depends on the sky light. This means that a realistic shadow can be represented by reflecting the color of the sky light on the shadow. In the real world, when the weather is clear, the shadow is sharp, and when the weather is cloudy, the shadow is diffuse. This is because when it is cloudy, the proportion of the sunlight is decreased and accordingly the proportion of the sky light is increased in the overall light source. By reflecting the sky light on the shadow, therefore, it is possible to simulate the change of the sharpness of the shadow according to the weather. This means that the overall contrast can be changed. It is possible to represent the non-sky area in cloudy weather by changing the dynamic range of the color in the overall image according to the weather and reducing the distributed values of the color.

Fourth, the effect of the illumination will be discussed when the altitude of the sun (time) is simulated. In simulating the change of time, the color of a lamp in the image can be changed to an illuminating color against a dark background. If the specified sun altitude or time exceeds a predetermined reference value, the change takes place. At this time, as shown in FIG. 12, a filter 121 is used to represent the pattern of the illuminating light from an illuminating lamp 122 in a pseudo manner. Based on a weighting 123 of this filter, a realistic illumination can be represented by averaging the image and the illuminating color.

As mentioned above, by relating the sunlight to the sky light with respect to the sky area and the non-sky area of a natural image, it is possible to easily perform a realistic and continuous simulation of time and weather.

Now, the description will be directed to an embodiment of the present invention referring to FIGS. 1 and 2 and 13 to 16.

Figure 1:
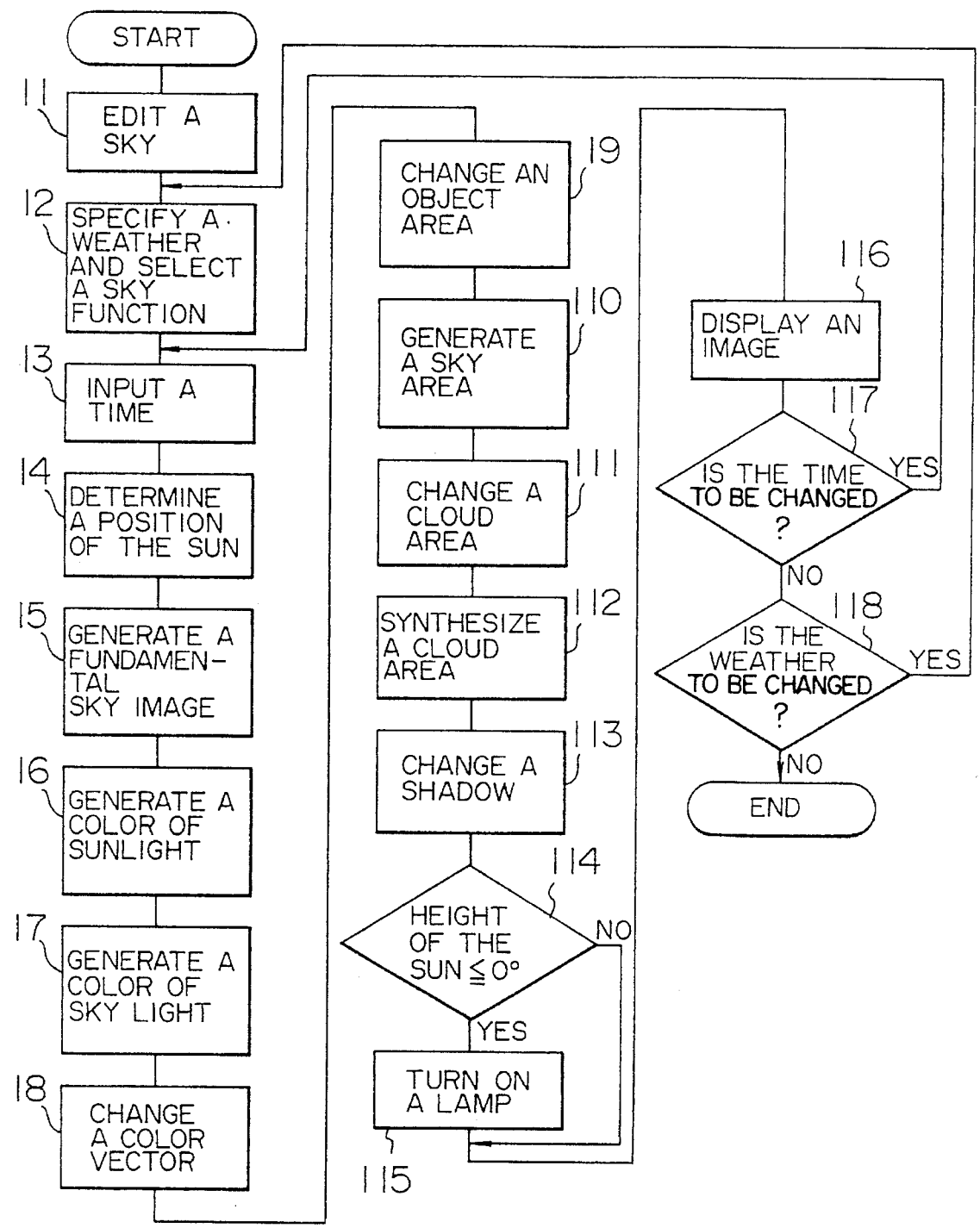
FIG. 1 is a flowchart showing a simulation for changing time and weather according to an embodiment of the invention.
Figure 2:
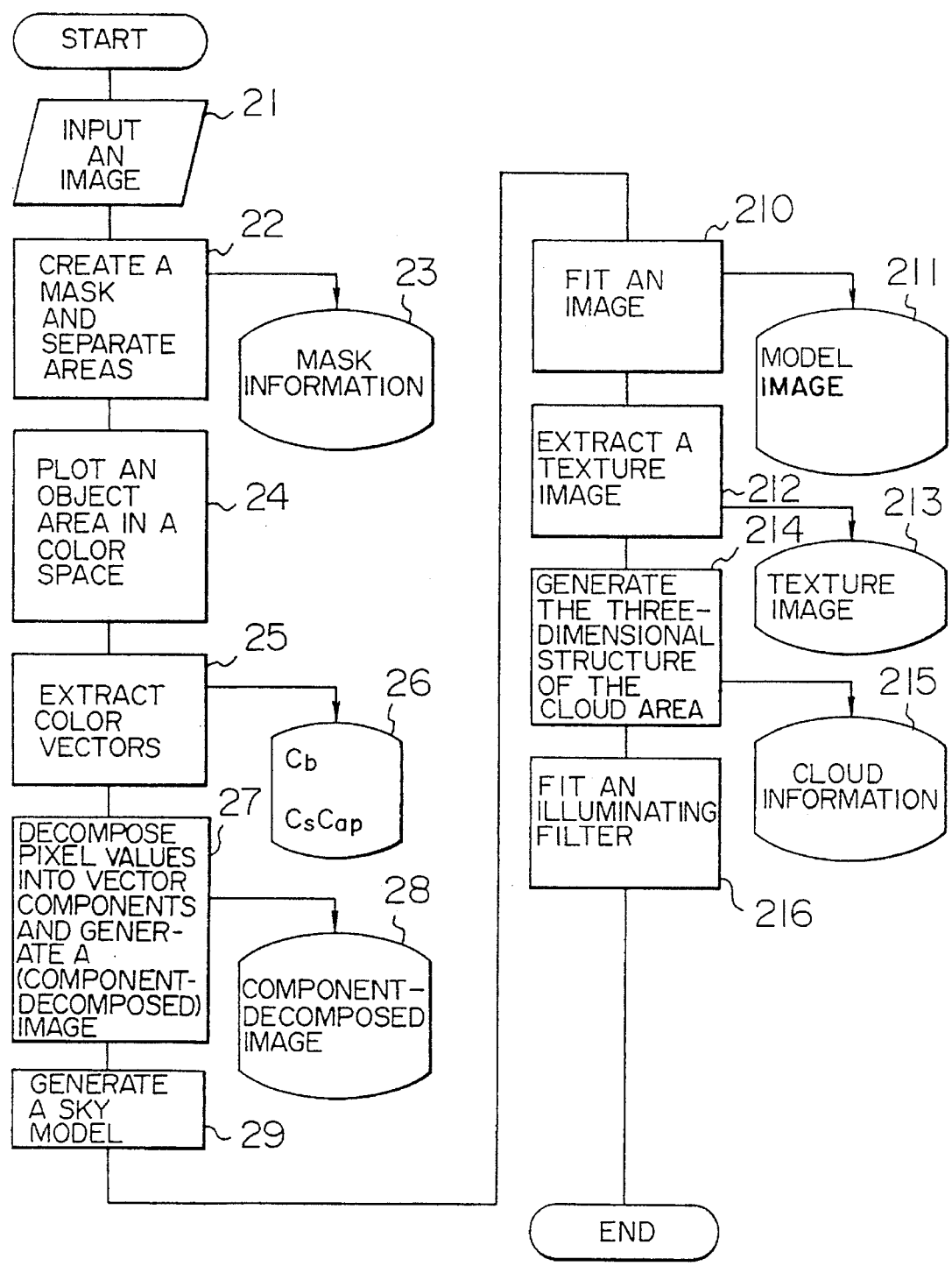
FIG. 2 is a flowchart showing a process for extracting data used in the simulation shown in FIG. 1.
Figure 3:
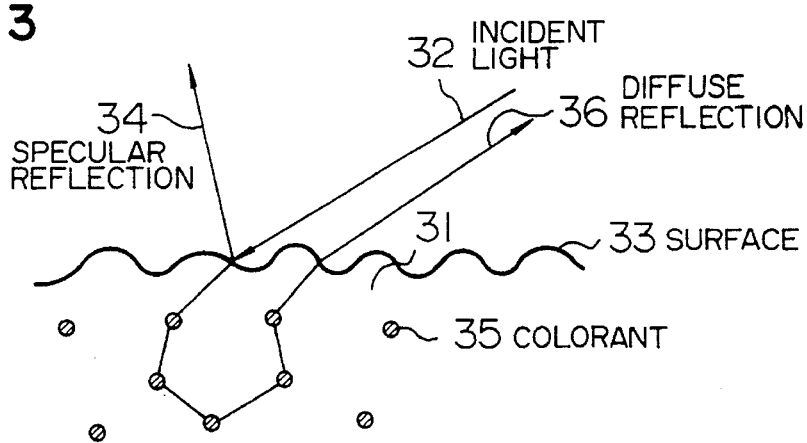
FIG. 3 is an explanatory view showing a prior art reflectance model for explaining a reflectance characteristic of an object.
Figure 4A:
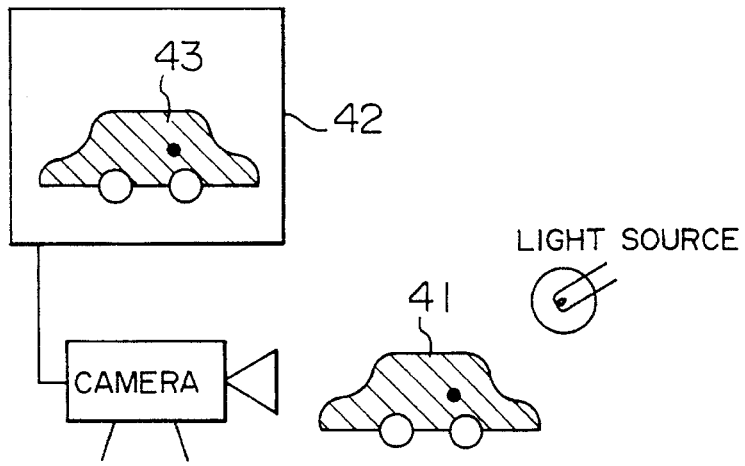
FIGS. 4(a) and 4(b) are explanatory views for explaining the prior art reflection model shown in FIG. 3.
Figure 4B:
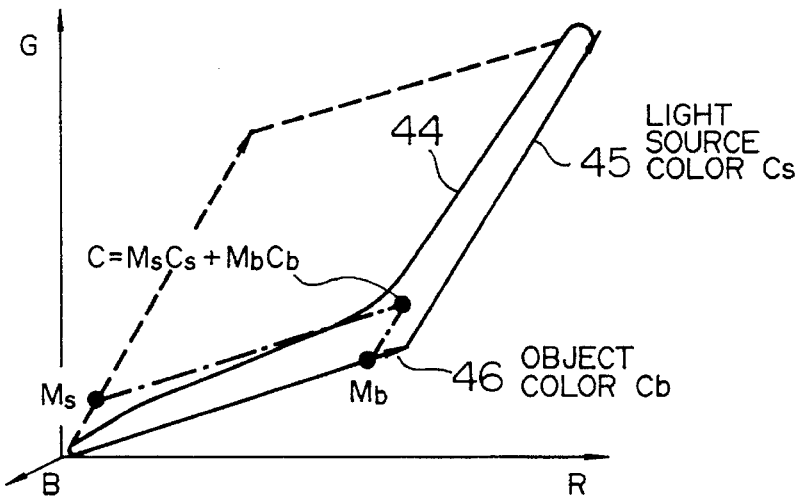
Figure 13:
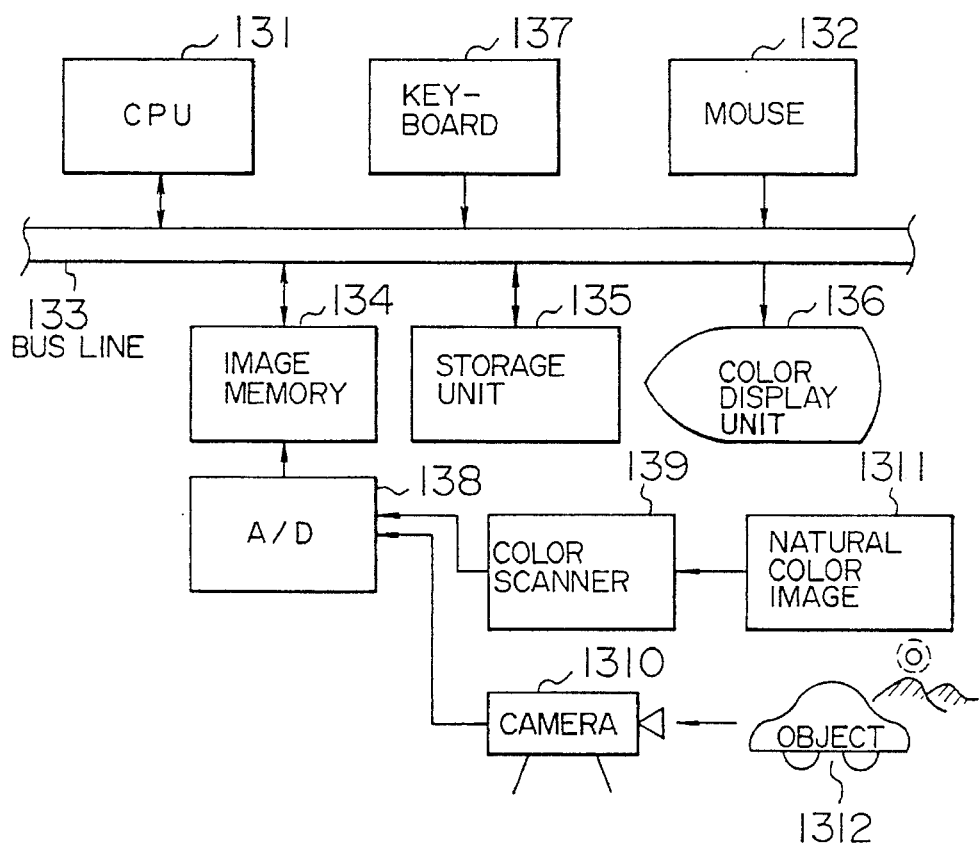
FIG. 13 is a block diagram showing a hardware arrangement according to an embodiment of the present invention.
Figure 14:
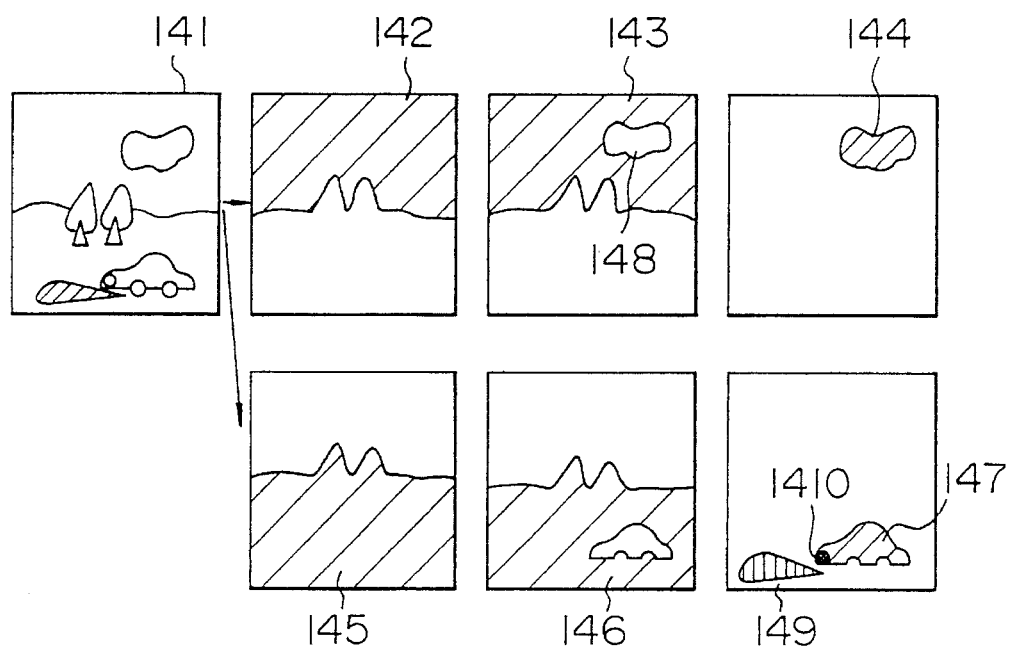
FIG. 14 is a view for explaining separation of an image into various areas.
Figure 15:
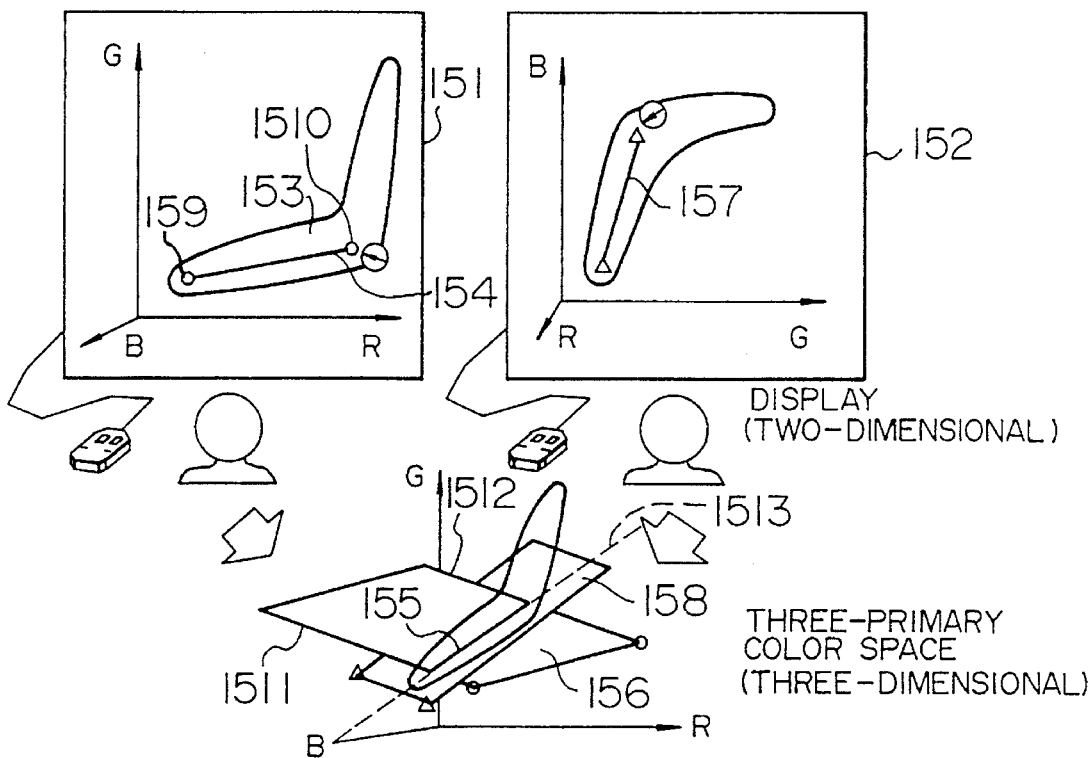
FIG. 15 is a view for explaining a method for extracting color vectors.

FIGS. 1 and 2 are flowcharts illustrating the process of this embodiment in detail. FIG. 13 is a block diagram showing a hardware arrangement of this embodiment. FIG. 14 is a view showing areas used in this embodiment. FIG. 15 is a view showing a method for extracting color vectors. FIG. 16 is a view showing a method for generating a three-dimensional structure of a cloud.

In this embodiment, by changing the weather from clear to cloudy or vice versa in a natural color image and specifying a time, it is possible to properly change the time. Further, to change a color of an object, it is necessary to change a reflectance of an object for representing the color of the object in a light environment where the time is changed properly.

Turning to FIG. 13 of a block diagram showing a device implementing this invention, 139 and 1310 respectively denote a color scanner and a camera through which an original image is input. 138 is an analog-to-digital (A/D) converter. 134 is an image memory for storing the input image. 131 is a CPU. 135 is a storage unit. 136 is a color display unit for displaying an image. 132 and 137 are respectively a mouse and a keyboard constituting input units.

The present embodiment is arranged to have two processes, that is, a process of extracting necessary data from a natural image, and a process of changing a color of an object by changing a reflectance of the object, and weather and time in real time.

Now, the description will be directed to the process of extracting the data with reference to FIG. 2.

In a step 21 for inputting an image (see FIG. 2), an object 1312 in FIG. 13 is imaged by the camera 1310 to produce an image signal. The image signal is sent to the A/D converter 138 in which the image signal is converted into a digital image signal. Then, the digital image signal of the object 1312 is stored in the image memory 134. A natural color image 1311 in FIG. 13 is read by the color scanner 139 to produce an image signal. The image signal is sent to the A/D converter 138 in which the image signal is converted into a digital image signal. The digital image signal of the natural color object 1311 is stored in the image memory 134.

In a step 22 for creating a mask for separating areas (see FIG. 2), an image 141 stored in the image memory 134 (see FIG. 13) is separated into a sky area 142 and a non-sky area 145 as shown in FIG. 14. For performing the separating process, the image 141 is displayed on the color display unit 136 (see FIG. 13) so that an operator may specify two or more points on the border of each area on the displayed image 141 with the mouse 132. From the sky area 142, a cloud area 144 is extracted so as to create a non-cloud area 143 excluding the cloud area 144. A cut-away portion 148 corresponding to the cloud area 144 is created in the non-cloud area 143 by synthesizing a line around the cloud area 144. From the non-sky area 145, an object area 147 and a non-object area 146 are separated for the purpose of changing a color of the object area 147. Further, a shadow portion 149 is extracted from the non-object area 145 and an illuminating portion 1410 such as a car lamp is also separated from the non-object area 145. For each of these areas 142, 143, 144, 145, 146, 147, 149 and 1410, mask information 23 (see FIG. 2) indicating a corresponding area in the image 141 is obtained and is stored in the storage unit 135 of FIG. 13.

In a step 24 for plotting colors of the object area 147, the pixel values of three primary colors for the object area 147 (see FIG. 14) are plotted in a three-primary color space. In a step 25 for extracting color vectors, several color vectors are extracted from a distribution in the color space. These extracted vectors 26 are stored in the storage unit 135 (see FIG. 13). The vectors correspond to an object color Cb, a reflectance Co, a main light source color (sunlight color) Cs, an ambient color Ca, a surface light source color (sky light color) Cap, and a color texture Cd.

To extract the vectors, the method disclosed in JP-A-2-119827 is used. This method was invented by the inventors of the present invention. In a three-primary color space shown in FIG. 6, the pixel values 61 of the object area are located close to vectors of the object color 62 and the main light source color 63. By utilizing this fact, the vectors of the object color 62 and the main light source color 63 are extracted. Then, a vector of the ambient light color 64 is obtained with the origin of the three-primary color space being assumed as a start point and the start point of the object color vector 62 being assumed as an end point. A color texture vector 65 is obtained as a vector oriented in the same direction as a product of the object color vector 62 and the main light source color vector 63 and having a certain magnitude. For example, to obtain the object color vector 62, as shown in FIG. 15, a projection plane 151 of the three-primary color space is displayed on the display unit 136 shown in FIG. 13. By specifying a line 154 in an area 153 in the projection plane 151 where the plotted pixel values are clustered in a linear form, one plane 156 containing an object color vector 155 in the three-primary color space is defined. After projecting the three-primary color space from a different angle of projection to obtain a different projection plane 152, by specifying a line 157 in an area where the plotted pixel values are clustered in a linear form, another plane 158 is defined. Then, a line of intersection 1513 between these two planes 156 and 158 in the three-primary color space is determined. The object color vector 155 lies on the line of intersection 1513. The end points 159 and 1510 of the line 153 specified in the projection plane 151 are assumed to define lines 1511 and 1512 on the plane 156 in the three-primary color space. The points of intersection between these lines 1511, 1512 and the line of intersection 1513 are assumed to define start and end points of the object color vector 155. The main light source color vector can be extracted by the same method.

In a step 27 for decomposing the pixel values into vector components (see FIG. 2), each pixel value in the object area is decomposed into components Ms of the main light source color vector Cs, Mb of the object color vector Cb and Md of the color texture vector Cd. These components Ms, Mb and Md can be obtained as follows. Herein, the pixel value C indicated in the expression (4) set forth above is assumed with B=0.

$$C'=C-(Ca) \qquad (11)$$

$$b1=(C' \cdot Cs),\ b2=(C' \cdot Cb),\ b3=(C' \cdot Cd)$$

$$a1=(Cs \cdot Cs),\ a2=(Cb \cdot Cb),\ a3=(Cd \cdot Cd) \qquad (12)$$

$a4=(Cs \cdot Cb)$, $a5=(Cb \cdot Cd)$, $a6=(Cd \cdot Cs)$

Using the expressions (11) and (12), the following expression (13) can be solved to obtain the values of Ms, Mb and Md for each pixel value in the object area so as to obtain a component-decomposed image 28 (see FIG. 2).

$$Ms \cdot a1 + Mb \cdot a4 + Md \cdot a6 = b1$$

$$Ms \cdot a4 + Mb \cdot a2 + Md \cdot a5 = b2 \quad (13)$$

$$Ms \cdot a6 + Mb \cdot a5 + Md \cdot a3 = b3$$

The component-decomposed image 28 (see FIG. 2) is stored in the image memory 134 (see FIG. 13).

In a step 29 for generating a sky model, the parameters of several predetermined sky color functions are determined so as to define a sky color function used for changing a time. According to this embodiment, the color of the sky model is determined by the function for determining two sky luminous intensities, clear and cloudy, described in the references 1 and 2 and the function for relating the sky luminous intensity to a color. Herein, the parameters are used for specifying a latitude, a date, clear (blue sky with no clouds) or cloudy (sky covered with clouds). The other meteorological conditions utilize the predetermined standard values, so that the sky color function may become a function of the altitude and the position of the sun. Further, the foregoing conditions produce a function which relates the altitude of the sun, the position of the sun and time to one another. That is, by inputting a time, the sky model is uniquely defined.

In a step 210 for fitting an image to the sky model, it is necessary to know a viewpoint direction (orientation) and a field angle (height dimension and horizontal dimension) used when the image was picked up. If such information is provided when the image is picked up, it may be used. In actuality, however, it is typical that such information cannot be obtained from a natural image. Hence, some values are predetermined to enable an operator to specify the proper information. To match the horizon of the sky model to the horizon of the image, the image is displayed on the display unit 136 (see FIG. 13) so that an operator may specify one point on the horizon of the image with the mouse 132. After the specified point on the horizon is matched to the horizon of the sky model by using the viewpoint orientation, the right and left edges and the upper and lower edges as defined by the field angle are mapped on the sky model. The other points in the sky model corresponding to the other points in the image are obtained by an interpolating technique.

The resulting correspondence between the image and the sky model is used to produce a model 211 corresponding to the model image 89 shown in FIG. 8 which is stored in the image memory 134 shown in FIG. 13.

In a step 212 for extracting a texture image (see FIG. 2), the texture image for the non-cloud area 143 (see FIG. 14) is extracted. At first, several times are input and the color of the sky model is uniquely defined for each input time. Then, for each time, a fundamental sky image is generated by using the model image. Then, for each fundamental sky image, a sum of a difference between each pixel value of the non-cloud area and a corresponding pixel value of the fundamental sky image is calculated and it is determined which fundamental sky image produces a minimum sum. An image in which each pixel value is the difference between a pixel value of the non-cloud area of the natural image and a corresponding pixel value of the fundamental sky image which produces the minimum sum is obtained as a texture image 213. The texture image 213 is stored in the image memory 134 shown in FIG. 13.

Figure 16A:
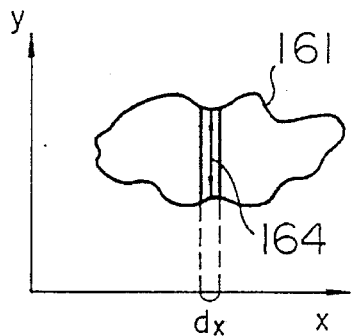
FIGS. 16(a) and 16(b) are views for explaining generation of a three-dimensional structure of a cloud.
Figure 16B:
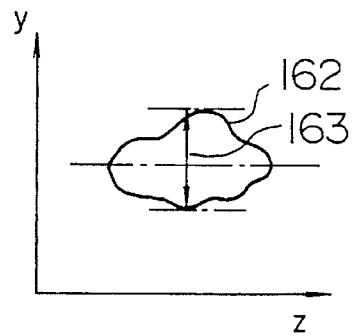

In a step 214 for generating a three-dimensional structure of the cloud area 144 shown in FIG. 14 (see FIG. 2), as shown in FIG. 16(b), a cloud template 162 is prepared. A template is selected about a partial cloud image. Assuming that the horizontal direction of the image is x and the vertical direction of the image is y, the selected template is fitted into the image. In FIG. 16(a), 161 denotes a partial cloud image corresponding to the cloud area 144. By integrating the template 162 shown in FIG. 16(b) along the x axis, it is possible to create a three-dimensional structure of the cloud area 144. During the integration, the template 162 is reduced or expanded in the y-direction and z-direction so as to make the y-axis width 163 of the template 162 equivalent to the y-axis width 164 of the partial cloud image 161 at the current integration interval dx. The three-dimensional structure of the cloud area 144 shown in FIG. 14 is created and is stored in the storage unit 135 shown in FIG. 13.

In a step 216 for fitting an illuminating filter (see FIG. 2), as mentioned with respect to FIG. 12, an illuminating filter for weighting the image when an illumination is turned on is located at the illuminating portion 1410 shown in FIG. 14 in advance.

Termination of the above-described processes terminates the preparations for simulating a weather and changing an object color by changing a reflectance of an object for the purpose of representing a color of an object under a variable light environment.

In turn, the description will be directed to the flow of simulation for changing a weather and a time of a natural image with reference to FIG. 1.

In a step 11 for editing a sky (see FIG. 1), to make the weather more cloudy, the separated cloud area (144 in FIG. 14) is synthesized on the non-cloud area (143 in FIG. 14) where desired so as to freely increase the amount of clouds in the sky area. On the color display unit 136 shown in FIG. 13, the image to be processed and the cloud image are displayed so that an operator may specify a cloud image with the mouse 132. After selecting the cloud image, a desired point in the sky area of the image is specified with the mouse and the cloud image is synthesized on the sky area at the specified point. At this time, the cloud image can be reduced or expanded.

In a step 12 for specifying a weather (see FIG. 1), a function is selected according to the weather for deriving a color of a sky in a sky 2hemispherical model used for generating a fundamental sky image. The method for deriving a sky light based on the location of the sun when it is clear or cloudy has been mentioned with respect to references 1 and 2. In the case where a cloud exists on a clear sky base, it is necessary to use the function for clear weather unless lots of clouds exist.

In a step 13 for inputting a time (see FIG. 1), a desired time is input.

In a step 14 for determining a position of the sun, the position of the sun is determined according to the input time.

In a step 15 for generating a fundamental sky image, the fundamental sky image is generated from the model image and the selected function for deriving a color of a sky in a hemispherical sky model. The fundamental sky image may be extracted from the model image, or the sky area of the model image may be synthesized as the changed sky area. At this time, in the steps 12, 13, 14, 16 and 17 shown in FIG. 1, the weather, the time, the position of the sun, the sunlight color, and the sky light color are inferred from the model image.

In a step 16 for generating a color of sunlight (see FIG. 1), a table is prepared for obtaining a color of the sunlight from the altitude of the sun. Based on the table, the color of the sunlight is determined. This table defines the color of the sunlight to be reddish when the sun is low, for example. The relation between the height of the sun and the color of the sunlight has been reported in the paper "Color Change due to Sun Height Considering Air Dispersion", Masadai Fukazawa, Society of Information Processing, Research Group of Graphics and CAD, 40-7 (1989.8). If a cloud area exists at the position of the sun, the intensity of the sunlight is decreased by multiplying an RGB value of the color of the sunlight by a constant of less than 1.

In a step 17 for generating a color of a sky light (see FIG. 1), the color of each point in the sky of the sky model is determined from the sky function selected in the step 12 and the sun position determined in the step 14 (see FIG. 1). Hence, by averaging the colors of all of the points in the sky of the sky model, a representative sky light color can be determined.

In a step 18 for changing a color vector, among the color vectors extracted from an object area, the main light source color Cs is changed by the color of the sunlight and Cap is changed by the color of the sky light. After changing these two colors vectors, in a step 19 for changing an object area (see FIG. 1), the reflectance Co is changed and the color of the object is changed with respect to the object area 147 in which its color is to be changed. Then, the color of the object area 147 is changed in accordance with the expressions (4), (5) and (6) set forth above. With respect to the non-object area 146 where the appearance of the object area 147 is changed in accordance with a change in the light environment without changing the color of the object itself, any one of the expressions (4), (5), (6) and (7), (8), (9), (10) set forth above can be used for obtaining the three-primary color values of the object area after its appearance has been changed.

In a step 110 for changing a sky area (see FIG. 1), the fundamental sky image and the texture image are added together at each corresponding pixel so as to obtain a base of the changed sky image.

In a step 111 for changing a cloud area, from the position of the cloud in the sky, the color of the sun, the position of the sun, and the color of the sky light obtained from the three-dimensional image of a synthesized cloud, assuming that the sunlight is a main light source Cs=Ie=(Re, Ge, Be), the color of the sky light is an ambient color Cap=Ia=(Ra, Ga, Ba) and the angle formed by the normals to the sun and the surface of the cloud is θ, the operation indicated in the following expression (14) is carried out by means of a simple CG-based method.

$$\begin{bmatrix} R \\ G \\ B \end{bmatrix} = \begin{bmatrix} Re \cdot \cos\theta \\ Ge \cdot \cos\theta \\ Be \cdot \cos\theta \end{bmatrix} + \begin{bmatrix} Ra \\ Ga \\ Ba \end{bmatrix} \quad (14)$$

In a step 112 for synthesizing a cloud area (see FIG. 1), the changed cloud area is synthesized on the sky area.

In a step 113 for changing a shadow, the orientation of the shadow is changed based on the position of the sun determined from the sky model so as to change the color of the shadow to a color having the same RGB ratio as the sky light. When it is cloudy or if the ratio of the intensity of the sunlight to the intensity of the sky light is small, gradation is performed on the shadow.

Likewise, when it is cloudy, to reduce the contrast of the overall image, the dispersion of the pixel values is reduced by making the dynamic range of the pixel values narrower.

In a step 115 for turning on a lamp or illumination (see FIG. 1), it is determined whether or not the height of the sun is 0 or lower, that is, whether it is night. If it is night, as mentioned above with respect to FIG. 12, the color of the illuminating portion is changed to the illuminating color and then is averaged with the color of the pixels in the surrounding area.

In a step 116 for displaying an image (see FIG. 1), an image is displayed. In a step 117, it is determined whether or not the time is to be changed. In a step 118, it is determined whether or not the weather is to be changed. If the answer in the step 117 is yes, the process returns to the step 13 for inputting a time. If the answer in the step 118 is yes, the process returns to the step 12 for specifying a weather and selecting a sky function.

With the foregoing method, for a natural color image, it is possible to provide a function of visually simulating environmental changes such as changes in weather and time for both the sky area and the object area. In the fields of making the presentations for the sales of goods, the landscape simulation of a building, and design of goods, it is possible to consider the environment of the object in question.

What is claimed is:

1. A method for changing a natural image comprising the steps of:

dividing a natural image into a sky area and an object area;

defining a sky model having at least one parameter selected from parameters representing (1) a position of a sun in a sky, (2) a color of sunlight from the sun, (3) a weather condition, and (4) a time of day;

generating a fundamental sky image approximating the sky area of the natural image based on the sky model, the step of generating a fundamental sky image including the step of assigning a value to the at least one parameter of the sky model to enable the fundamental sky image to approximate the sky area of the natural image;

generating a texture image representing differences between values of pixels in the sky area of the natural image and values of corresponding pixels in the fundamental sky image;

changing the fundamental sky image by changing the value assigned to the at least one parameter of the sky model to a desired value;

generating an image of a changed sky area by adding together the changed fundamental sky image and the texture image;

generating a surface light source vector representing a color of a surface light source for illuminating the object area of the natural image from the changed fundamental sky image;

generating a main light source vector representing a color of a main light source for illuminating the object area of the natural image from the sky model after the value assigned to the at least one parameter of the sky model has been changed to the desired value; and producing an image of a changed object area representing the object area of the natural image illuminated by the main light source and the surface light source by modifying values of pixels in the object area of the natural image in accordance with the main light source vector and the surface light source vector.

2. A method according to claim 1, wherein the sky model is a model of a sky hemisphere; and wherein the step of generating a fundamental sky image further includes the step of matching the sky area of the natural image to a portion of the sky hemisphere having a same viewpoint as the sky area of the natural image.

3. A method according to claim 2, wherein the step of generating a fundamental sky image further includes the step of generating a model image from the portion of the sky hemisphere having the same viewpoint as the sky area of the natural image, the model image representing positions of points on the sky hemisphere corresponding to points in the sky area of the natural image, the position of each of the points on the sky hemisphere being defined by an angle of orientation relative to the sky hemisphere and an angle representing a height above a horizon of the sky hemisphere.

4. A method according to claim 1, wherein the main light source is the sun.

5. A method according to claim 1, wherein the object area includes a shadow; and wherein the step of producing an image of a changed object area includes the steps of:

changing the shadow based on the at least one parameter of the sky model; and producing an image of a changed object area by modifying values of pixels in the changed shadow and in a remaining portion of the object area excluding the shadow in accordance with the main light source vector and the surface light source vector.

6. A method according to claim 5, wherein the step of changing the shadow includes the step of computing a weighted average of pixels in the object area around a border area of the shadow and pixels in the border area of the shadow based on the at least one parameter of the sky model.

7. A method according to claim 5, wherein the step of changing the fundamental sky image includes the step of changing the value assigned to the at least one parameter of the sky model to a desired value which changes at least one of the color of the surface light source and a weather condition representing an amount of clouds; and wherein the step of changing the shadow includes a process of changing a color of the shadow based on the desired value of the at least one parameter which changes at least one of the color of the surface light source and a weather condition representing an amount of clouds.

8. A method according to claim 1, wherein the at least one parameter of the sky model includes the parameter representing the position of the sun in the sky;

wherein the step of changing the fundamental sky image includes the step of changing the value of the parameter representing the position of the sun to a value representing a different position of the sun;

wherein the texture image includes a cloud image corresponding to a cloud in the sky area of the natural image;

wherein the method further comprises the step of changing the color of the main light source based on the different position of the sun and a position of the cloud image in the texture image;

wherein the step of generating a main light source vector includes the step of generating a main light source vector representing the changed color of the main light source; and wherein the step of producing an image of a changed object area includes the step of producing an image of a changed object area by modifying values of pixels in the object area of the natural image in accordance with the main light source vector representing the changed color of the main light source and the surface light source vector.

9. A method according to claim 1, wherein the object area includes an area having an illuminating function;

wherein the at least one parameter of the sky model includes the parameter representing the position of the sun in the sky and the parameter representing the time of day;

wherein the step of changing the fundamental sky image includes at least one of the steps of changing the value of the parameter representing the position of the sun to a value representing a different position of the sun and changing the value of the parameter representing the time of day to a value representing a different time of day; and wherein the step of producing an image of a changed object area includes the step of changing a color of the area having an illuminating function from a non-illuminating color to an illuminating color based on at least one of the different position of the sun and the different time of day.

10. A method according to claim 9, wherein the step of changing a color of the area having an illuminating function from a non-illuminating color to an illuminating color includes the step of computing a weighted average of colors of pixels in the object area around the area having an illuminating function and the illuminating color.

11. A method according to claim 1, wherein the texture image includes a cloud image corresponding to a cloud in the sky area of the natural image;

wherein the method further comprises the step of changing the cloud image; and wherein the step of generating an image of a changed sky area includes the step of adding together the changed fundamental sky image and the texture image having the changed cloud image.

12. A method according to claim 11, wherein the step of changing the cloud image includes the step of changing at least one of a form of the cloud image and a position of the cloud image in the texture image.

13. A method according to claim 11, wherein the at least one parameter of the sky model includes the parameter representing the position of the sun in the sky;

wherein the main light source is the sun; and wherein the step of changing the cloud image includes the step of changing the cloud image based on at least one of the color of the surface light source, the color of the main light source, and the position of the sun in the sky.

14. A method according to claim 11, wherein the step of changing the cloud image includes the step of changing the cloud image to represent a specified weather condition.

15. A method according to claim 1, wherein the step of producing an image of a changed object area includes the steps of:

changing at least one of a color of the main light source and a color of the surface light source, wherein changing the color of the main light source changes the main light source vector and an object color vector and changing the color of the surface light source changes the color of an ambient light vector, the main light source vector representing a specular component of light reflected from a portion of the object area to be changed, the object color vector representing a diffuse component of light reflected from the portion of the object area to be changed, and the ambient light vector representing a shift between an origin of a color space and a distribution in the color space of colors of pixels in the portion of the object area to be changed; and calculating a color C of each pixel in the portion of the object area to be changed from the expression $C = C_s M_s + C_b M_b + C_a$ wherein Cs is the main light source vector, Cb is the object color vector, Ca is the ambient light vector, and Ms and Mb are constants.

16. A method according to claim 15, wherein the portion of the object area to be changed is divided into a plurality of areas based on an angle formed by the portion of the object area to be changed with a sky orientation or with a ground; and wherein the ambient light vector Ca has a different value for each of the areas of the portion of the object area to be changed.

17. A method according to claim 1, wherein the pixels in the object area each have a color $C = (R, G, B)$; and wherein the step of producing an image of a changed object area includes the step of calculating new colors $C' = (R', G', B')$ of pixels in a portion of the object area to be changed from the expressions $R' = rks*(R-Ra) + rka*Ra$ $G' = gks*(G-Ga) + gka*Ga$ $B' = bks*(B-Ba) + bka*Ba$ wherein $Ca = (Ra, Ga, Ba)$ is an ambient light vector representing a shift between an origin of a color space and a distribution in the color space of the colors of the pixels in the portion of the object area to be changed, and $Ks = (rks, gks, bks)$ and $Ka = (rka, gka, bka)$ are constants.

18. A method according to claim 17, wherein $Ks = (rks, gks, bks)$ is calculated from the expressions $rks = Rs'/Rs$ $gks = Gs'/Gs$ $bks = Bs'/Bs$ wherein $S = (Rs, Gs, Bs)$ is a main light source vector representing the color of the main light source before being changed and $S' = (Rs', Gs', Bs')$ is a main light source vector representing the color of the color of the main light source after being changed.

19. A method according to claim 17, wherein $Ka = (rka, gka, bka)$ is calculated from the expressions $rka = Rap'/Rap$ $gka = Gap'/Gap$ $bka = Bap'/Bap$ wherein $Cap = (Rap, Gap, Bap)$ is a surface light source vector representing the color of the surface light source before being changed and $Cap' = (Rap', Gap', Bap')$ is a surface light source vector representing the color of the surface light source after being changed.

20. A method according to claim 17, wherein $Ka = (rka, gka, bka)$ is calculated from the expressions $rka = Rap'/Rap*g$ $gka = Gap'/Gap*g$ $bka = Bap'/Bap*g$ wherein $Cap = (Rap, Gap, Bap)$ is a surface light source vector representing the color of the surface light source before being changed, $Cap' = (Rap', Gap', Bap')$ is a surface light source vector representing the color of the surface light source after being changed, and g is a variable indicative of a location of each pixel in the portion of the object area to be changed.

21. A method according to claim 20, wherein the portion of the object area to be changed is divided into a plurality of areas based on an angle formed by the portion of the object area to be changed with a sky orientation or with a ground; and wherein the variable g has a different value for each of the areas of the portion of the object area to be changed.

22. A method according to claim 1, wherein the pixels in the sky area and the object area each have a color; and wherein the method further comprises the step of changing a dispersion of the colors of the pixels in the sky area and the object area in accordance with a specified weather condition.

23. A method according to claim 1, wherein the pixels in the sky area and the object area each have a color; and wherein the method further comprises the step of changing a dynamic range of the colors of the pixels in the sky area and the object area in accordance with a specified weather condition.

* * * * *